B. O. STARK.
INFLATING SYSTEM.
APPLICATION FILED MAR. 22, 1916.
1,217,234.
Patented Feb. 27, 1917.
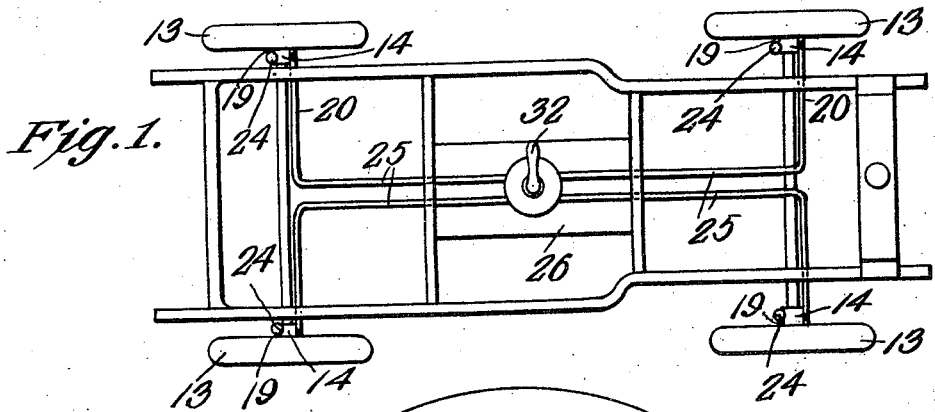
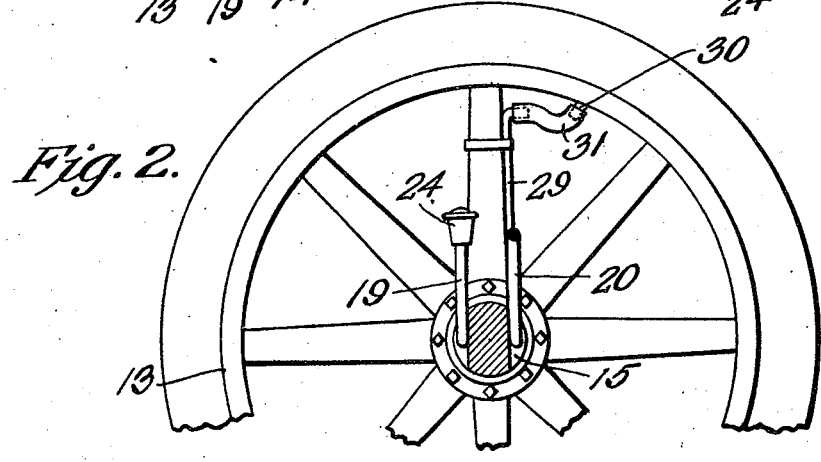
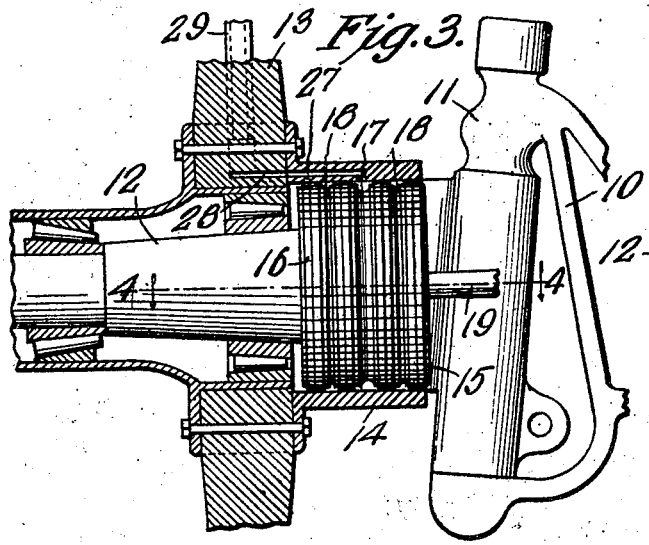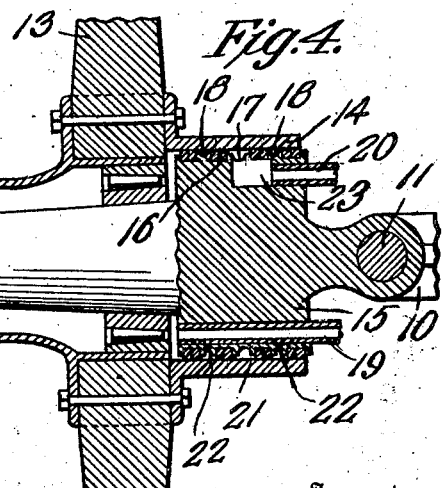
Witnesses
James F. Crown,
H. M. Test.
Inventor
B. O. Stark,
By
Attorney

UNITED STATES PATENT OFFICE.

BENJAMIN O. STARK, OF STOTESBURY, MISSOURI.

INFLATING SYSTEM.

1,217,234.  Specification of Letters Patent.  Patented Feb. 27, 1917.

Application filed March 22, 1916. Serial No. 86,019.

*To all whom it may concern:*

Be it known that I, BENJAMIN O. STARK, a citizen of the United States, residing at Stotesbury, in the county of Vernon, State of Missouri, have invented certain new and useful Improvements in Inflating Systems; and I do hereby declare the following to be a full, clear, and exact description of the invention, such as will enable others skilled in the art to which it appertains to make and use the same.

This invention relates to improvements in inflating systems, and particularly to inflating systems for automobile tires.

One object of the invention is to provide a novel and simple system for inflating individually, or collectively the tires of the wheels of an automobile.

Another object is to provide a novel means for inflating the tires of an automobile under varying conditions, such as standing, in motion or otherwise, the same being operable by the driver without leaving his seat.

A further object is to provide a novel automobile tire inflating system which can be readily applied to any of the automobiles now on the market without any great modifications in the structures of the automobile.

Other objects and advantages will be apparent from the following description when taken in connection with the accompanying drawing.

In the drawing:

Figure 1 is a top plan view of my automobile tire inflating system;

Fig. 2 is an enlarged elevation of a portion of the front axle and a wheel showing the application of my invention;

Fig. 3 is an enlarged vertical longitudinal sectional view through the axle and hub;

Fig. 4 is an enlarged horizontal sectional view on the line 4—4 of Fig. 3.

Referring particularly to the accompanying drawing, 10 represents a portion of the front axle of an automobile, 11 the vertical pivoted post forming a part of the steering knuckle, and 12 the stub shaft or axle which is rotatably mounted on the said post and carries a wheel 13. The hub 14 of the wheel receives therein the enlarged portion 15 of the stub axle, and carried by this enlarged portion are the peripherally arranged packing rings 16. Formed circumferentially at the center of the enlargement is a channel 17, which conveys air to the tire, as will appear later. This enlargement also has the peripheral grooves 18 for receiving the lubricating oil. Mounted on the post 11 are two pipes 19 and 20, both of which extend into the inner end of the enlargement 15, the former into a chamber 21 which communicates with the lubricant grooves 18 by means of the passages 22. The pipe 20 communicates with the air chamber 17, by means of the passage 23. The pipe 19 is connected to an oil cup 24, or may be otherwise connected to a source of supply of oil. The pipe 20 is connected, by means of the pipe 25, to a storage tank of compressed air, as shown at 26. Formed in the hub 14, and running longitudinally therein, is a channel 27, the inner end of which communicates with the air chamber or groove 17, as shown at 28, while the other end has connected thereto a pipe 29 extending radially along one of the spokes of the wheel, to a point where it is connected to the inflation valve 30 by means of a coupling 31.

As seen in the diagrammatic view, a pipe 25 connects each of the pipes 20 with the compressed air tank, so that the driver can, by manipulation of the valve 32, cause compressed air to flow to the tire of any of the wheels, by way of the pipes 20, air chambers or grooves 17, channels 27, and pipes 29. It will thus be seen that any one or all of the tires can be inflated whether the automobile is standing, or while in motion.

While I have shown the air reservoir mounted in the center of the automobile it will be understood that the same may be mounted at the side, front, or rear, without in any way departing from the spirit of the invention or scope of the claims.

What is claimed is:

1. In a pneumatic tire inflating means, the combination with a steering knuckle including a post and a stub axle having a wheel with a pneumatic tire mounted thereon, said wheel having a hub provided interiorly with a laterally opening air passage and a radial passage leading therefrom, said stub axle formed with a circular flange having an annular air passage formed circumferentially thereof, a compressed air supply pipe connected to the circular flange and communicating with the said air passage, an annular hub flange carried by the wheel and circumscribing the said circular flange, the hub flange being formed with a laterally extending air passage communicating with the said annular air passage and registering with the lateral air passage of the hub, and a conduit connecting the inflating valve of the tire with the radial air passage of the wheel hub and lying wholly within the space circumscribed by the wheel rim.

2. In a pneumatic tire inflating means, the combination with a steering knuckle including a post and a stub axle having a wheel with a pneumatic tire mounted thereon, said stub axle formed with a circular flange having an annular air passage formed circumferentially thereof, a compressed air supply pipe connected to the circular flange and communicating with the air passage therein, packing rings carried by the circular flange, said circular flange having oil grooves arranged alternately of the packing rings, a supply pipe communicating with the said oil grooves, an annular hub flange carried by the wheel and circumscribing the said circular flange and provided with an air passage communicating with the annular air passage, said packing rings acting as a seal for the annular air passage, a conduit carried by the wheel hub communicating with the passage in the hub flange thereof, and a conduit connecting the inflating valves of the tire with the hub conduit.

In testimony whereof, I affix my signature, in the presence of two witnesses.

B. O. STARK.

Witnesses:
A. F. KING,
S. S. GORDON.